(12) United States Patent
Wu et al.

(10) Patent No.: US 7,694,157 B2
(45) Date of Patent: Apr. 6, 2010

(54) HEAT DISSIPATION DEVICE AND CONTROL METHOD FOR SAME

(75) Inventors: Chia-Feng Wu, Taoyuan Hsien (TW); Cheng-Chieh Liu, Taoyuan Hsien (TW); Yueh Lung Huang, Taoyuan Hsien (TW); Yi-Chieh Cho, Taoyuan Hsien (TW)

(73) Assignee: Delta Electronics, Inc., Taoyuan Sien (TW)

( * ) Notice: Subject to any disclaimer, the term of this patent is extended or adjusted under 35 U.S.C. 154(b) by 498 days.

(21) Appl. No.: 10/922,851

(22) Filed: Aug. 23, 2004

(65) Prior Publication Data

US 2005/0268128 A1 Dec. 1, 2005

(30) Foreign Application Priority Data

May 25, 2004 (TW) ............... 93114746 A

(51) Int. Cl.
*G06F 1/32* (2006.01)
*G05D 23/00* (2006.01)
(52) U.S. Cl. .................. 713/300; 700/304; 702/132
(58) Field of Classification Search ......... 713/300–324; 700/299, 300, 304; 702/130, 131, 132
See application file for complete search history.

(56) References Cited

U.S. PATENT DOCUMENTS

| 6,216,235 | B1 * | 4/2001 | Thomas et al. ............... 713/501 |
| 6,470,289 | B1 * | 10/2002 | Peters et al. ................. 702/132 |
| 6,601,168 | B1 * | 7/2003 | Stancil et al. ................ 713/100 |
| 6,777,900 | B2 * | 8/2004 | Lee ............................. 318/268 |
| 6,914,779 | B2 * | 7/2005 | Askeland et al. ........ 361/679.51 |
| 6,996,441 | B1 * | 2/2006 | Tobias ......................... 700/44 |
| 2003/0236594 | A1 * | 12/2003 | Frankel et al. .............. 700/300 |

FOREIGN PATENT DOCUMENTS

| CN | 2375031 A | 4/2000 |
| CN | 2616727 | 5/2004 |
| JP | 64-042714 A | 2/1989 |
| TW | 420326 A | 6/1987 |

* cited by examiner

*Primary Examiner*—Dennis M Butler
(74) *Attorney, Agent, or Firm*—Birch, Stewart, Kolasch & Birch, LLP

(57) ABSTRACT

A heat dissipation device for cooling an electronic device. The heat dissipation device comprises a fan, a controller connected to the fan and coupled to the electronic device and a sensor connected to the controller and sending a first signal to the controller by detecting a temperature variation in the electronic device. The electronic device sends a second signal to the controller, the controller changes the speed of the fan according to either the first signal or the second signal.

17 Claims, 3 Drawing Sheets

HEAT DISSIPATION DEVICE AND CONTROL METHOD FOR SAME

This Nonprovisional application claims priority under 35 U.S.C. § 119(a) on Patent Application No(s). 093114746 filed in Taiwan, Republic of China on May 25, 2004, the entire contents of which are hereby incorporated by reference.

BACKGROUND OF THE INVENTION

1. Field of the Invention

The invention relates to a heat dissipation device.

An electronic device such as a desktop computer requires a heat dissipation device such as a fan.

2. Brief Discussion of the Related Art

A conventional heat dissipation device mainly employs two control methods, a temperature control method and a pulse width modulation control method, shown in FIGS. 1a and 1b respectively. In FIG. 1a, a temperature sensor 20 is connected to a fan 10. The temperature sensor 20 detects the temperature variation of a heat source, such as an electronic element (not shown) and transmits a signal to change the speed of the fan 10. Reference numbers 12 and 14 represent positive and negative voltage output from a power supply to the fan 10. Reference number 16 is a squared-wave signal FG indicating speed of the fan 10 and the signal transmitted to the electronic device (not shown) serving as a feedback signal.

In FIG. 1b, the speed of the fan 10' is controlled by a pulse width modulation signal (referred to as a PWM signal herein) 40 from the electronic device. The output of the PWM signal 40 for fan speed control is based on various requirements, for example, a sudden rise in temperature of electronic elements. Reference numbers 12' and 14' represent positive and negative voltage from a power supply to the fan 10'. Reference number 16' is a squared-wave signal FG indicating speed of the fan 10' and transmitted to the electronic device (not shown) serving as a feedback signal.

Either the fan 10 or the fan 10' is controlled by a unitary control method. This, however, limits the applicability of the fan to various electronic devices using different control methods.

Thus, a fan provided with several control modes is required for various applications.

SUMMARY OF THE INVENTION

Accordingly, embodiments of the invention provide a heat dissipation device with several control modes adaptable for various electronic devices.

The heat dissipation device of an embodiment of the invention for cooling an electronic device comprises a fan, a controller connected to the fan and coupled to the electronic device and a sensor connected to the controller. A first signal is sent to the controller by detecting temperature variation of the electronic device, and the electronic device sends a second signal to the controller. The controller changes the speed of the fan according to either the first signal or the second signal. The controller changes the speed of the fan according to the second signal instead of the first signal when the controller receives the second signal. The second signal can be a pulse width modulation signal or a voltage signal.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DETAILED DESCRIPTION OF THE PREFERRED EMBODIMENTS

First Embodiment

Figure 1A:
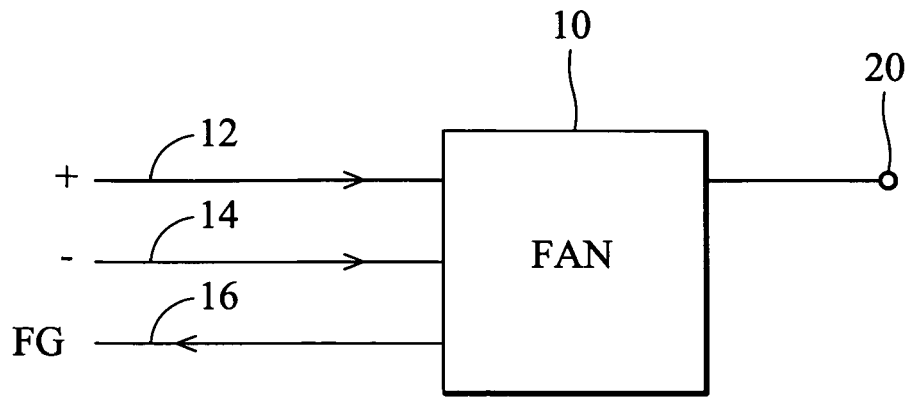
FIG. 1a is a block diagram of a conventional heat dissipation device.
Figure 1B:
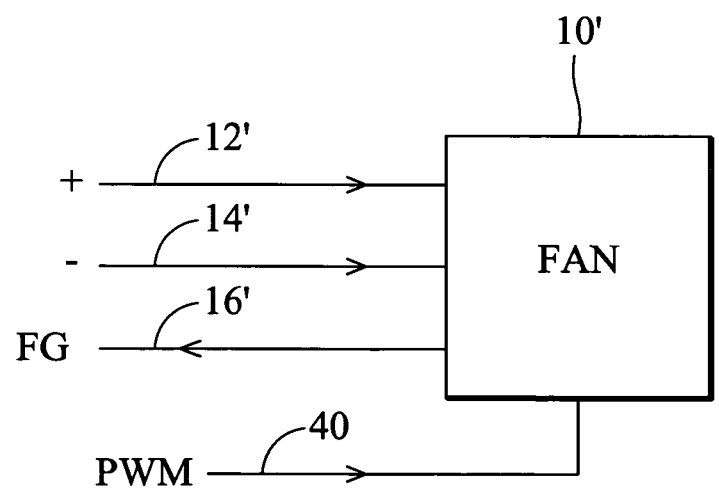
FIG. 1b is a block diagram of another conventional heat dissipation device.
Figure 2:
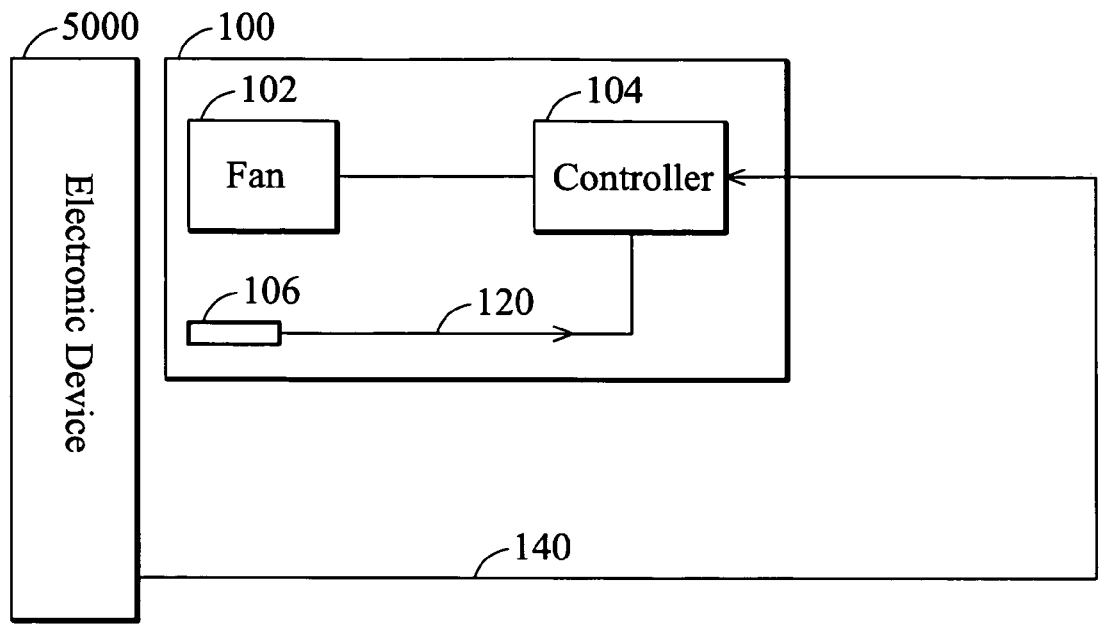
FIG. 2 is a block diagram of a heat dissipation device of a first embodiment of the invention.

A heat dissipation device 100 of this embodiment combines the temperature control mode and the PWM control mode. The heat dissipation device 100 comprises a fan 102, a controller 104 connected to the fan 102 controlling speed thereof and a temperature sensor 106 connected to the controller 104, detecting the temperature variation in an electronic device 5000 and sending a first signal 120 to the controller 104 to controll the fan speed.

The electronic device 5000 is also connected to the controller 104 and can output a second signal 140 to the controller 104. The second signal 140 can be a PWM signal. In the described configuration, the fan speed is controlled by the controller 104 according to the first signal 120 from the temperature sensor 106. When the electronic device 5000, however, has some particular requirements, for example a sudden rise in temperature of certain elements thereof, the second signal 140 is input to the controller 104 by the electronic device 5000. The controller 104 changes the fan speed according to the second signal 140 instead of the first signal 120 for the particular cooling requirement of the electronic device 5000.

Thereby, both the temperature control mode and PWM control mode can be applied to the heat dissipation device 100.

Second Embodiment

Figure 3:
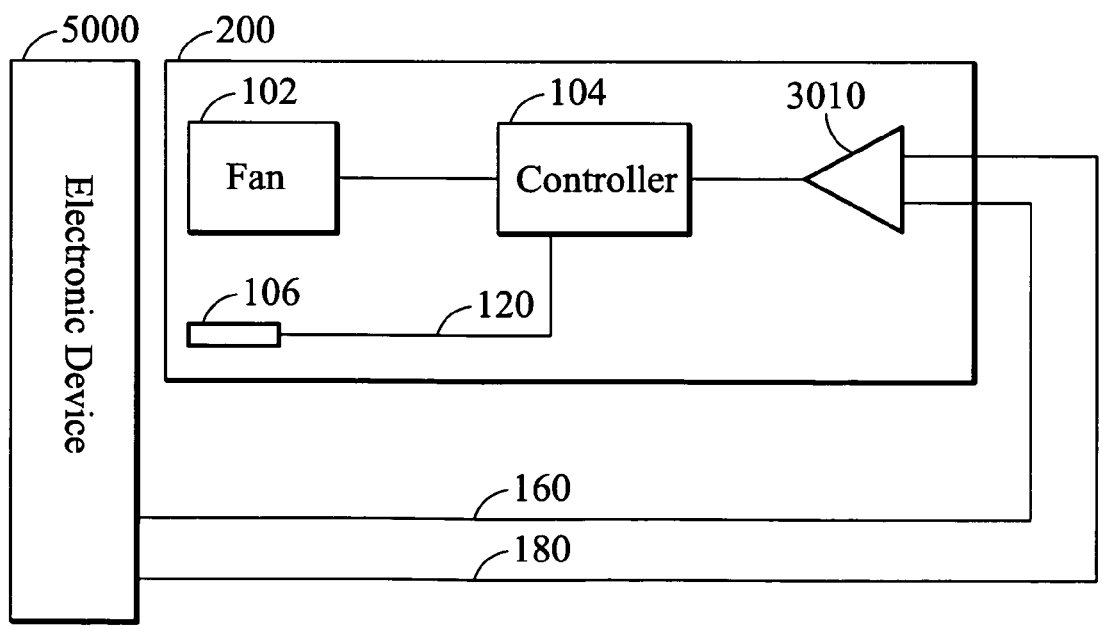
FIG. 3 is a block diagram of a heat dissipation device of a second embodiment of the invention.

Referring to FIG. 3, a heat dissipation device 200 of this embodiment is provided with a logic element 3010 receiving a third signal 160 and a fourth signal 180 from the electronic device 5000. The logic element 3010 determines whether the third signal 160 or the fourth signal 180 is input to the controller 104. The third signal 160 can be a PWM signal, and the fourth signal 180 can be a voltage signal. The controller 104 is designed to be capable of accepting both the PWM signal and the voltage signal. As in the first embodiment, the controller 104 receives the first signal 120 from the temperature sensor 106 to control the fan speed under normal conditions, however, when the electronic device 5000 has some particular requirements, the controller 104 receives the PWM signal (the third signal 160) or the voltage signal (the fourth signal 180) instead of the first signal 120 to control the fan speed. Thus, three control modes can be combined into a heat dissipation device.

Third Embodiment

Figure 4:
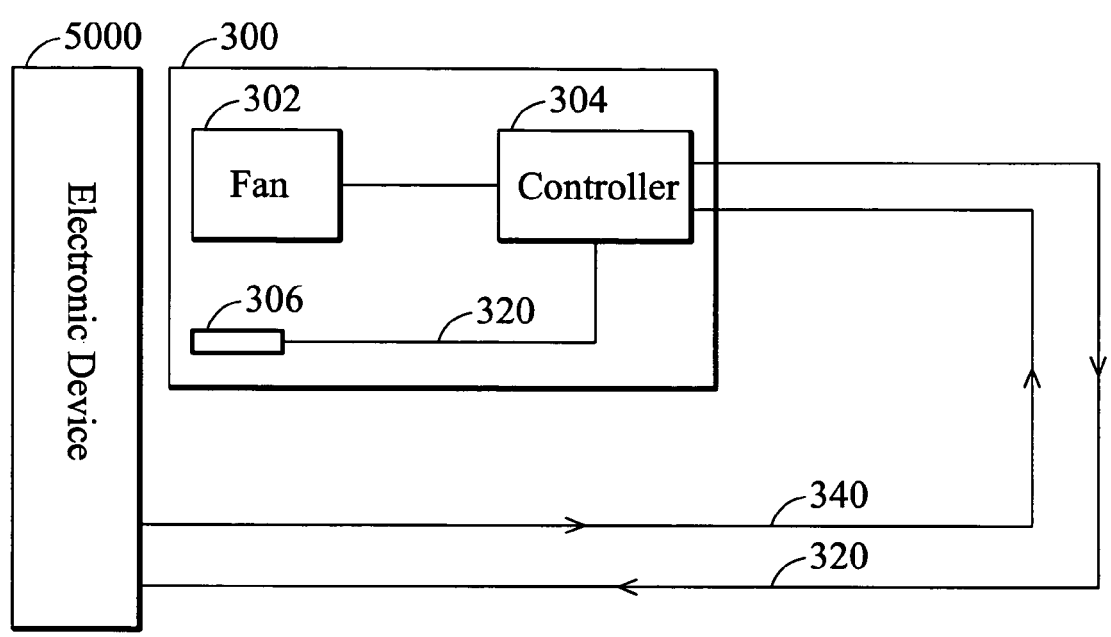
FIG. 4 is a block diagram of a heat dissipation device of a third embodiment of the invention.

FIG. 4 shows a third embodiment of the invention wherein a heat dissipation device 300 comprises a fan 302, a controller 304 connected to the fan 302 and a temperature sensor 306 connected to the controller 304, detecting temperature variation in the electronic device 5000 and sending a first signal 320 to the electronic device 5000 via the controller 304. The electronic device 5000 outputs a second signal 340 to the controller 304 to control speed of the fan 302. In this embodiment, the heat dissipation device 5000 can accept either a PWM control signal or a voltage control signal (the second signal 340) only. The first signal 320 from the temperature sensor 306 is provided to the electronic device 5000 instead of the controller 304, and the electronic device 5000 transmits the second signal 340 to control the fan speed according to the first signal 320 or other signals (for other requirements). In this embodiment, the temperature control mode is combined with a heat dissipation device which is provided with only PWM control mode.

In embodiments of the invention, various control modes such as a temperature control mode, a PWM control mode and a voltage control mode are combined into a heat dissipation device. The heat dissipation device of this embodiment can have broader application than the conventional.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A heat dissipation device for cooling an external electronic device, the heat dissipation device comprising:
   a fan;
   a controller connected to the fan and the external electronic device to be cooled; and
   a sensor connected to the controller and sending a first signal to the controller when the sensor detects a first temperature variation of the external electronic device;
   wherein the external electronic device directly sends a second signal to the controller, and the controller modulates the speed of the fan according to either the first signal or the second signal so that the heat dissipation device cools the external electronic device; and
   wherein the second signal sent by the external electronic device corresponds to a second temperature variation of the external electronic device and is independent of the first signal sent by the sensor.

2. The heat dissipation device as claimed in claim 1, wherein the controller modulates speeds of the fan according to the second signal instead of the first signal when the controller receives the second signal.

3. The heat dissipation device as claimed in claim 1, wherein the second signal is a pulse width modulation signal.

4. The heat dissipation device as claimed in claim 1, wherein the second signal is a voltage signal.

5. The heat dissipation device as claimed in claim 1, wherein the first signal is sent to the external electronic device via the controller.

6. The heat dissipation device as claimed in claim 5, wherein the second signal output by the external electronic device is modulated according to the first signal.

7. The heat dissipation device as claimed in claim 6, wherein the second signal is a pulse width modulation signal.

8. A heat dissipation device for cooling an external electronic device, the heat dissipation device comprising:
   a fan;
   a controller connected to the fan and the external electronic device to be cooled;
   a sensor connected to the controller and capable of sending a first signal to the controller by detecting a first temperature variation of the external electronic device; and
   a logic element connected to the controller, receiving a second signal and a third signal from the external electronic device and determining whether the second signal or the third signal is input to the controller, wherein the controller modulates the speed of the fan according to the first signal, the second signal or the third signal; and
   wherein the second signal and the third signal sent by the external electronic device correspond to a second temperature variation of the external electronic device and are independent of the first signal sent by the sensor.

9. The heat dissipation device as claimed in claim 8, wherein speeds of the fan are modulated according to either the second signal or the third signal.

10. The heat dissipation device as claimed in claim 8, wherein the second signal is a pulse width modulation signal, and the third signal is a voltage signal.

11. A method of controlling a heat dissipation device, the heat dissipation device, for cooling an external electronic device, electrically connected to the external electronic device to be cooled and having a fan, a controller connected to the fan, and a sensor connected to the controller, the method comprising the following steps:
   sending a first signal by the sensor to the controller for controlling speeds of the fan when the sensor detects a first temperature variation of the external electronic device; and
   directly sending a second signal to the heat dissipation device by the external electronic device to replace the first signal for controlling the speeds of the fan,
   wherein the second signal sent by the external electronic device corresponds to a second temperature variation of the external electronic device and is independent of the first signal sent by the sensor.

12. The method as claimed in claim 11, wherein the second signal is directly sent to the controller by the external electronic device when the temperature of the external electronic device rises suddenly.

13. The method as claimed in claim 11 further comprising:
   sending the first signal to the external electronic device via the controller for generating the second signal.

14. The method as claimed in claim 11 further comprising:
   providing a logic element electrically connected between the controller and the external electronic device for inputting the second signal sent by the external electronic device to the controller.

15. The method as claimed in claim 14, wherein the second signal is one of the signals generated from the external electronic device and passing through the controller.

16. The method as claimed in claim 15, wherein the second signal is a pulse width modulation signal.

17. The method as claimed in claim 15, wherein the second signal is a voltage signal.

* * * * *